US007805659B2

(12) United States Patent
Takahashi

(10) Patent No.: US 7,805,659 B2
(45) Date of Patent: Sep. 28, 2010

(54) METHOD AND DATA STORAGE DEVICES FOR A RAID SYSTEM

(75) Inventor: Eisaku Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1021 days.

(21) Appl. No.: 11/526,729

(22) Filed: Sep. 26, 2006

(65) Prior Publication Data
US 2007/0250757 A1 Oct. 25, 2007

(30) Foreign Application Priority Data
Apr. 10, 2006 (JP) ............... 2006-108061

(51) Int. Cl.
*G11C 29/00* (2006.01)
(52) U.S. Cl. .................. 714/769; 714/770; 711/114
(58) Field of Classification Search ......... 714/769–770; 711/114
See application file for complete search history.

(56) References Cited

U.S. PATENT DOCUMENTS 4,611,314 A * 9/1986 Ogata et al. ............... 369/30.22

FOREIGN PATENT DOCUMENTS

JP 06-052635 2/1994

* cited by examiner

*Primary Examiner*—Guy J Lamarre
(74) *Attorney, Agent, or Firm*—Staas & Halsey LLP

(57) ABSTRACT

A method of controlling a RAID system including a plurality of disk devices is provided. The method allows for reading data recorded onto an area adjacent to an area where a write error occurs when the write error is detected while data is written into the disk device. When an error is detected from the data read from the adjacent area, the data recorded onto the adjacent area is restored by using a RAID function and the restored data is written into the adjacent area.

13 Claims, 8 Drawing Sheets

METHOD AND DATA STORAGE DEVICES FOR A RAID SYSTEM

BACKGROUND OF THE INVENTION

1. Field of the Invention

The present invention relates to a redundant-arrays-of-independent-disks (RAID) system.

2. Description of the Related Art

A Redundant Array of Independent Disks (RAID) is a family of techniques for managing multiple disks to deliver desirable cost, data availability, and performance characteristics to host environments. The RAID system allows for generating parity data from write data, and distributing and recording the write data and the parity data into a plurality of disk devices. According to the RAID system, if a read error occurs in any one of the disk devices while the data is read, the data is restored on the basis of read data and parity data stored in at least one other of the disk devices. It is few or rare that RAID cannot read data.

When the disk device writes data in the disk, a write error might be generated. The write error can have various causes. For example interface error, defect of disk and a vibration. If the write error occurs in a known disk device, the disk device itself makes a retry. If data writing is succeeded by making the retry, a host device is informed that the write error is recovered. The disk device is used for storing the data, as it is, except in cases where a large number of the write errors occur.

If the write error is not recovered even though the disk device itself makes the retry, the disk device informs the host device that the write error is not recovered, and the host device makes a retry for the part corresponding to the unrecovered write error. If the unrecovered write error is recovered, the disk device is used, as it is, except in cases where a large number of the write errors occur.

Further, if the host device makes a retry for the part corresponding to the unrecovered write error, it is determined that the part corresponds to a defect in a recording medium onto which data is recorded. Therefore, alternating processing is performed, for example, so as to determine the part to be a predetermined area on another medium.

However, as recording mediums increase in capacity, the density of tracks on the recording mediums have become increasingly high, as is the case with a medium 100 shown in FIG. 6. A head 104 is provided in a magnetic-disk device used for writing and/or reading data into and/or from a medium. The head 104 is positioned on a track 101 into which data is written, the track 101 being provided on the medium 100. If a vibration including an external vibration, a vibration inherent in a head arm, and so forth occurs while data writing is performed under the above-described circumstances, the head 104 is shifted to an adjacent track 102, or an adjacent track 103, as indicated by a trail 105.

The impact of the above-described write error is higher than that of an ordinary write error. Namely, the above-described write error may affect data recorded into the adjacent tracks and/or adjacent sectors.

For example, even though data recovery is performed at a position where the write error occurs, data may be erroneously written into the adjacent tracks and/or the adjacent sectors. In that case, an error occurs while data reading is performed.

Usually, a predetermined number of retries are made when a read error occurs. In the above-described case, however, it is difficult to read the erroneous data written into the adjacent tracks and/or the adjacent sectors because of earlier write error in adjacent track/sectors, even though the retries are made. Further, it could be determined that the position corresponding to the read error to be a defect in the medium, and alternating processing or the like is performed. For example, subsequently, an alternate area is consumed in vain.

If the read error occurs in an area adjacent to an area where the write error occurs, the read error can be recovered by performing data rewriting. For performing the data rewriting, however, there is a need to request a host device to transmit the data again, which increases processing load on the host device.

In the past, if external power such as shock is applied onto a disk device while data is recorded, incorrect data is often recorded. There have been disclosed methods for solving the above-described problem, as is the case with Japanese Unexamined Patent Application Publication No. 6-52635. Namely, when a write error is detected while data is recorded, a data-rewrite operation is executed for a sector with the same address as that of a sector where the write error is detected in two record tracks adjacent to a target track.

According to known technologies, it is requested that a host device transmit data again, the data being stored in a sector at the same position as that of the track adjacent to the sector where the write error is detected. Subsequently, processing load on the host device increases.

On the other hand, the RAID system allows for restoring the data corresponding to the read error. However, the RAID system is configured without consideration of an effect produced by the write error on an area adjacent to an area where the write error occurs.

SUMMARY OF THE INVENTION

According to one of the present embodiment of the invention, there is provided an apparatus. The apparatus comprises a plurality of storage devices capable of restoring data in any one of the storage devices from data in rest of the storage devices. The apparatus comprises a controller to control the apparatus according to a process.

The process detects a write error when data is written into a first area of a storage device. The process reads data from a second area adjacent to said first area in the storage device. The process detects any error in the data read from said second area. The process restores the second area data from other storage devices into said second area, upon detecting any error in the second area.

DESCRIPTION OF THE PREFERRED EMBODIMENTS

The inventor propose embodiments for a RAID system and a write-error-recovery method which determine whether data recorded onto an area adjacent to a data-write area is corrupted when a write error occurs. If the data in the adjacent area is corrupted, the RAID system and the write-error-recovery method recover the corrupted data using only a RAID device.

Figure 1:
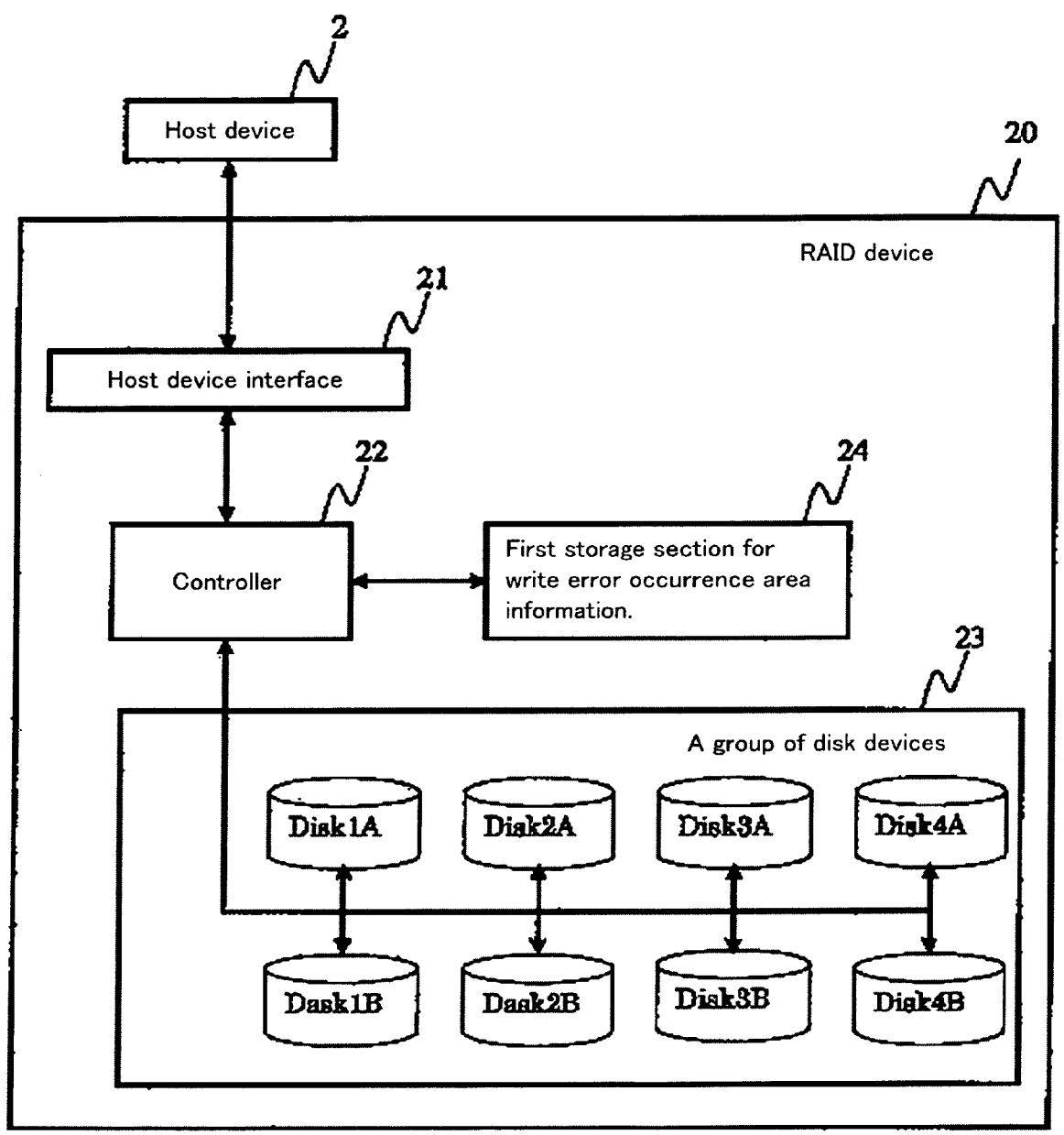
FIG. 1 shows an example basic configuration of a RAID system according to an embodiment of the present invention.
Figure 2:
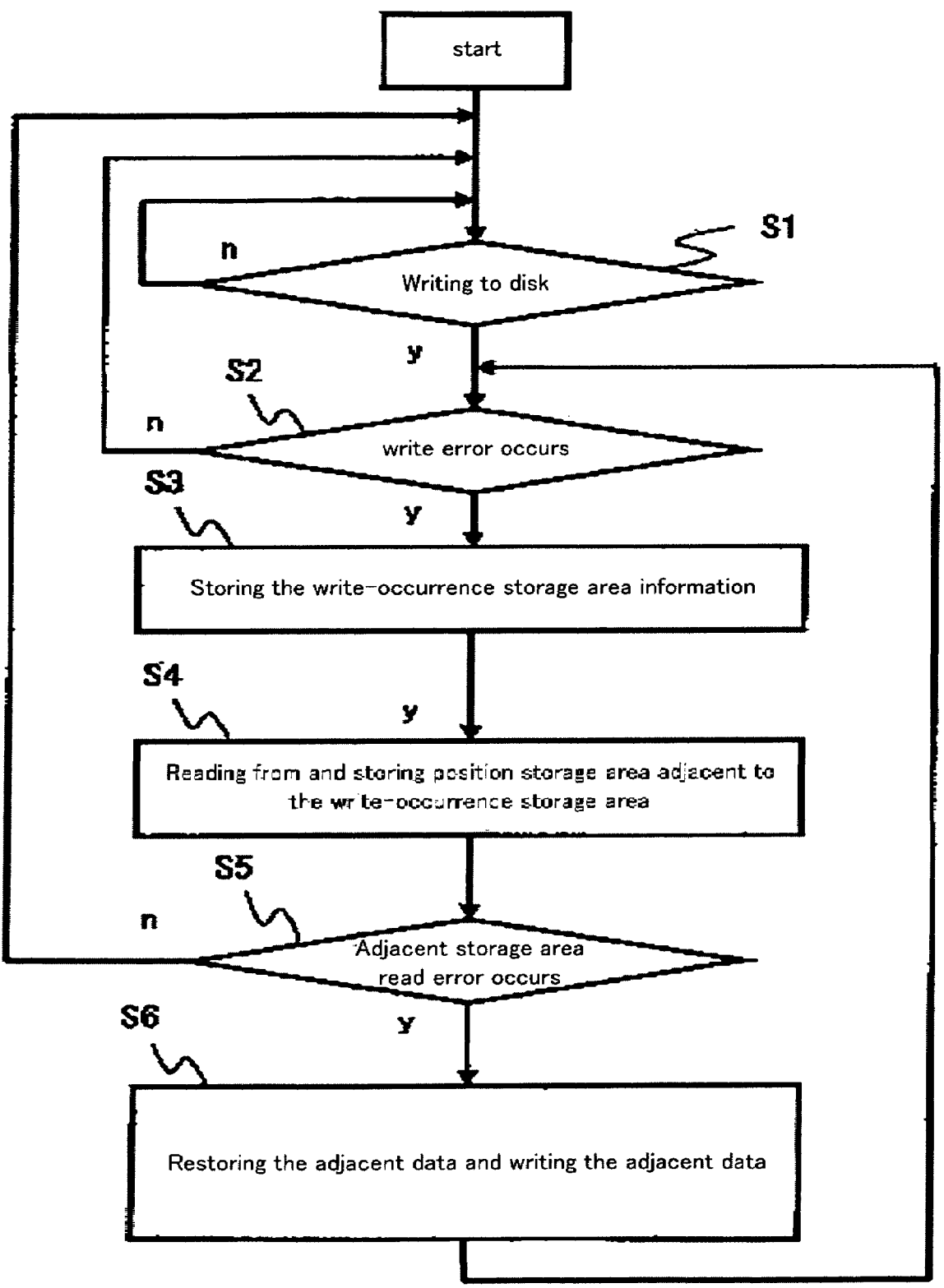
FIG. 2 is a flowchart illustrating basic processing performed, so as to recover a write error, according to an embodiment of the present invention.

FIG. 1 shows an example configuration of a RAID system 20 according to a first embodiment of the present invention. FIG. 2 is a flowchart illustrating write-error-detection processing and restoration processing that are, for example, performed or implemented in or embodied in a controller 22 provided in the RAID system 20, where the restoration processing is performed, so as to restore data after a write error is detected. According to an aspect of the embodiments, the controller 22 (32) is implemented in software and/or computer hardware to perform the embodiment processes described here. Write processing is performed, so as to write data into an information-recording medium. The write error occurs, for example, when data is not written during the write processing, whereby the write processing ends in failure. Read processing is performed, so as to read data from the information-recording medium. A read error occurs, for example, when data is not read during the read processing, whereby the read processing ends in failure.

Figure 6:
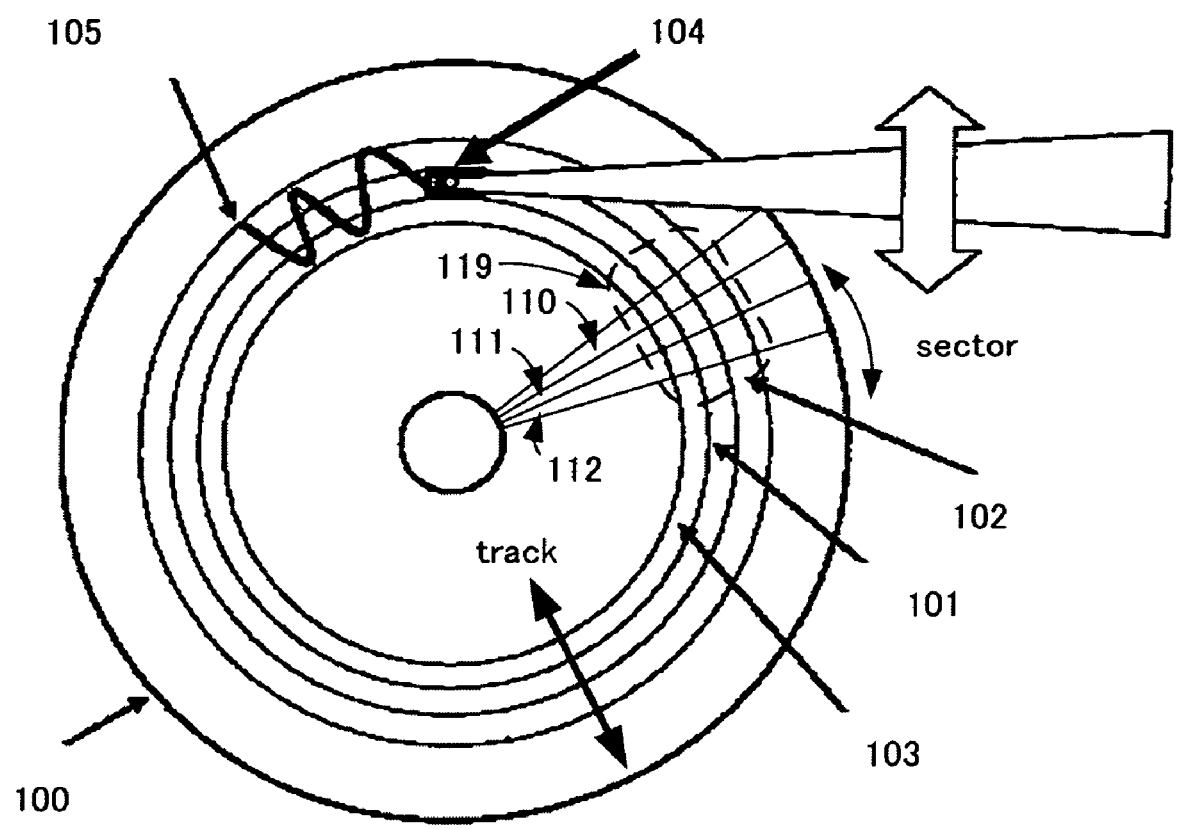
FIG. 6 shows an example of a disk 100 read/write head position displacement caused by an external vibration, a vibration inherent in a head arm, and so forth.
Figure 7:
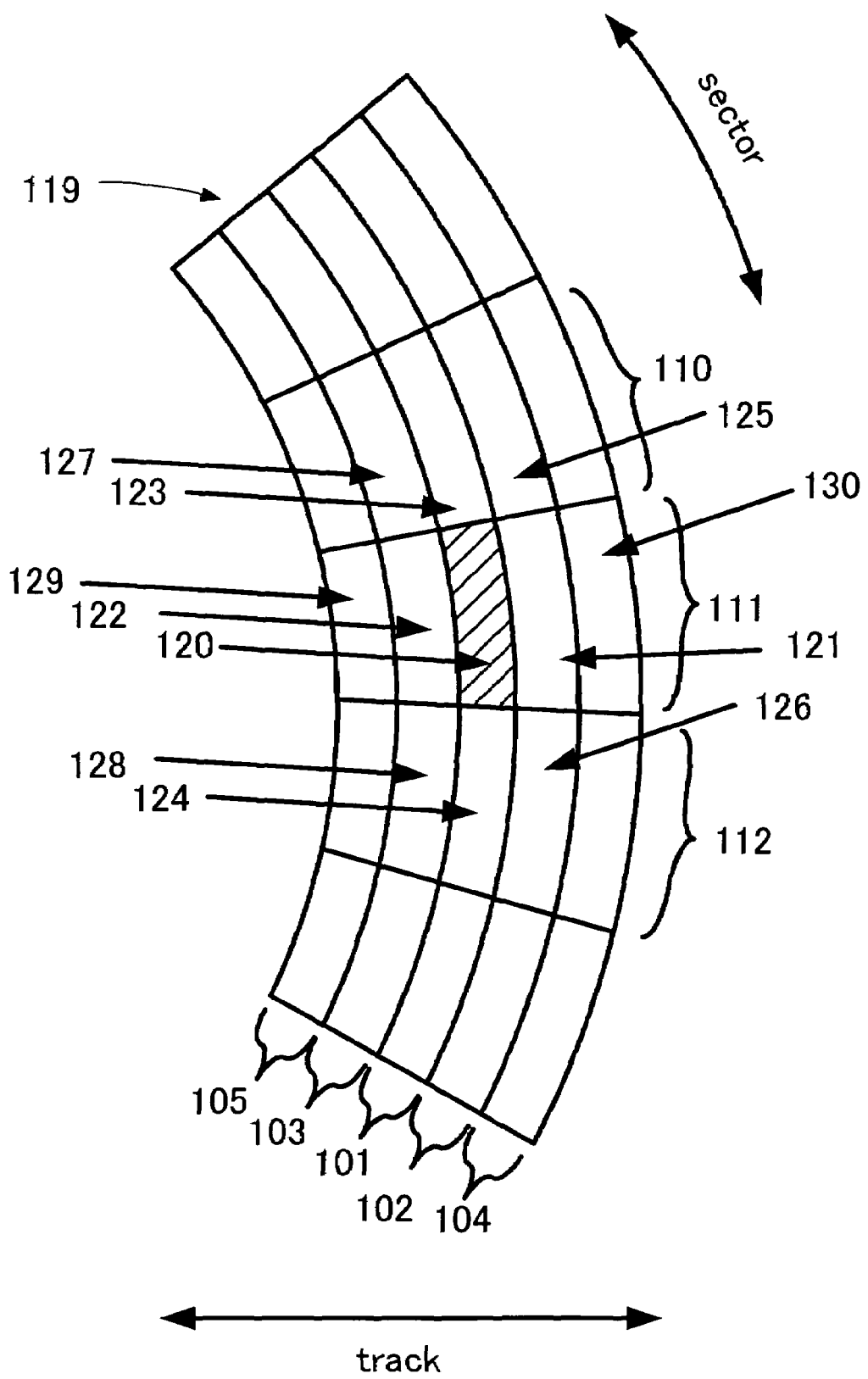
FIG. 7 shows a more detail construction of the disk 100, according to an embodiment of the present invention.
Figure 8:
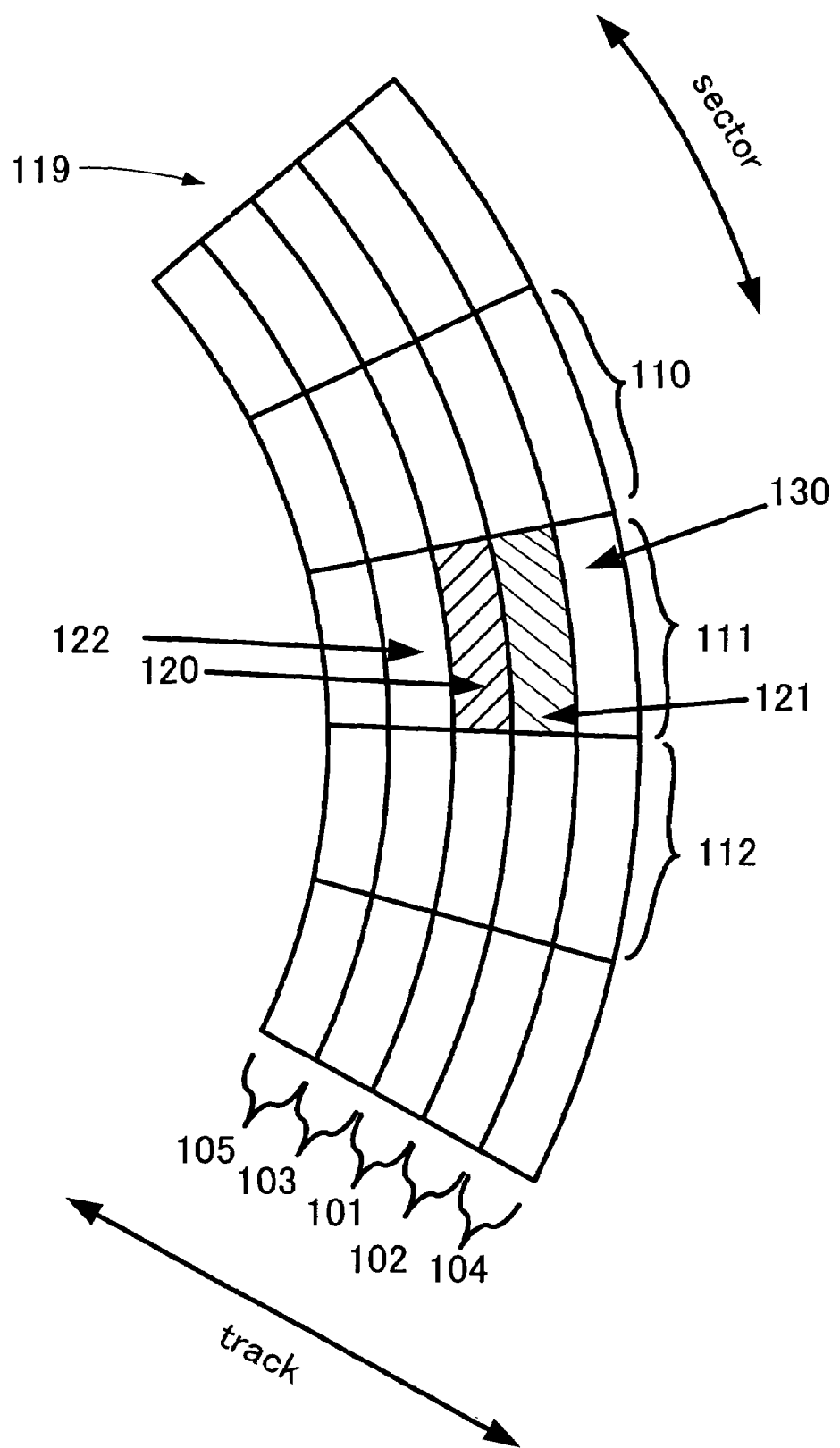
FIG. 8 shows a more detail construction of the disk 100, including write error occurrence adjacent areas, according to an embodiment of the present invention.

The RAID system 20 shown in FIG. 1 includes a host-device-interface 21, the controller 22, a group of disk devices 22, and the first storage section 24. The RAID system 20 is connected to the host device 2. The host-device-interface 21 is provided between the host device 2 and the controller 22 so that a data-read instruction, a data-write instruction, and data are transmitted and/or received between the host device 2 and the controller 22. The controller 22 controls the RAID system 20 and performs processing on the basis of the data-read instruction, the data-write instruction, and the data that are transmitted from the host-device-interface 21. The disk-device group 23 is a set of a plurality of disk devices and stores and/or reads data according to an instruction transmitted from the controller 22. The set is provided, as redundant arrays of independent disks (RAID). The first storage section 24 can be an area in a memory. The memory is a computer readable medium. The computer readable medium can be, for example, a register in the RAM, hard disk drive. When the above-described write error occurs, the first storage section 24 stores information about an area where the write error occurs. Here, according to the above-described embodiment, the write error area can be stored in tracks and/or sectors. With reference to FIGS. 6-8. term "track" denotes, for example each of circumferences of many concentric circles provided on a single disk. The disks are arranged, where each of the disks stores information in bits on the tracks. A head 104 moves on the tracks so that the data-write processing and the data-read processing are performed. The term "adjacent track" denotes a track adjacent to a track where data should be written in the direction of the radius of a medium 100, for example in FIGS. 6-8 tracks 102, 103 are adjacent to track 101. A sector denotes the unit in which the track provided on a disk is divided. The term "adjacent sector" denotes a sector adjacent to a track where data should be written in the direction of the circumference of the medium 100, for example in FIGS. 6-8 sectors 110, 112 are adjacent to track 111.

FIG. 7 shows a more detail-construction of the disk 100. The disk 100 has a plurality of tracks 101, 102, 103, 104 and 105 and a plurality of sectors 110, 111, 112. An area on the disk 100 can be determined by track and sector. A plurality of areas 119 are a part of the disk 100. A plurality of areas 119 comprises area 120, 121, 122, 123, 124, 125, 126, 127, 128, 129 and 130.

The flowchart shown in FIG. 2 illustrates basic processing performed, so as to recover data, the data being subjected to the write processing when the write error occurs, according to an embodiment of the present invention. The controller 22 waits for the data-write instruction transmitted from the host device 2 via the host-device-interface 21 (step S1: No). Upon receiving the data-write instruction, the controller 22 instructs the disk-device group 23 to write data (step S1: Yes). If no write error occurs (step S2: No), the controller 22 returns to step S1, so as to receive the next data-write instruction. If the write error occurs (step S2: Yes), the controller 22 acquires information indicating the area 120 of FIG. 7 where a write error occurs as a write error occurrence area and stores the write-error-occurrence area information into the first storage section 24 (step S3), and reads data stored in an area adjacent to the write-error-occurrence area (step S4). The write-error-occurrence area is a position being specified by track and/or sector.

The controller 22 determines whether the data recorded onto the adjacent area is readable, the data being readable, at step S4 (step S5). If determined that the data of adjacent area is readable (step S5: No), it is determined that the data of adjacent area is not corrupted so that the controller 22 returns to step S1, so as to receive the next data-write instruction. On the other hand, if determined that the adjacent data reading ends in failure or corrupted, that is to say, when the read error occurs (step S5: Yes), the data read from the adjacent area, at step S4, is restored (step S6). The above-described restoration is achieved by restoring the original data of adjacent area recorded onto the adjacent area by using the RAID function and writing the data of adjacent area into the adjacent area. The RAID function can restore the data on the basis of read data and parity data stored in at least one other of the disk devices 23. Then, the controller 22 returns to step S2, so as to perform the write processing without a break.

In FIG. 7, for example, an area 120 is a write error occurrence area (S3). Area 121, 122 are an adjacent area of track direction of the write error occurrence area 120. Area 123, 124 are an adjacent area of sector direction of the write error occurrence area 120. Area 125 is adjacent to an adjacent area 123 and an adjacent area 121. Area 126 is adjacent to an adjacent area 124 and an adjacent area 121. Area 127 is adjacent to an adjacent area 123 and an adjacent area 122. Area 128 is adjacent to an adjacent area 124 and an adjacent area 122. For example, the adjacent areas 121 122 can be overwritten by a head 104 when the head is moved by the shock from external vibration (S2: Yes).

When the controller 22 detects the writing error (S2: Yes), the controller 22 gets a position information of the area 120 of the writing error occurrence. The position information is an address on the disk 100. The controller 22 translates the logical address of the writing error occurrence data to the address on the disk 100. For example, the controller 22 gets the adjacent area 121, 122, 123 and 124 position information that corresponded or are possible target affected areas to the write error position information. The data is read from the adjacent area 121, 122, 123 and 124, and when the read error occurs (step S5: Yes), the controller restores the data of adjacent area 121, 122, 123 and 124 (step S6) using a RAID function.

According to an aspect of the embodiments, determination of such target affected disk areas is configurable manually (system administrator) and/or automatically, for example based upon write error, write error cause, disk condition, host application requirements, etc.

The adjacent areas may comprise one or more tracks as adjacent to the write error occurrence area 120. For example, area 129, 130 in FIG. 7. Moreover, the adjacent areas may comprise areas adjacent to the track direction and/or the sector direction. For example, area 125, 126, 127, 128 in FIG. 7.

Figure 3:
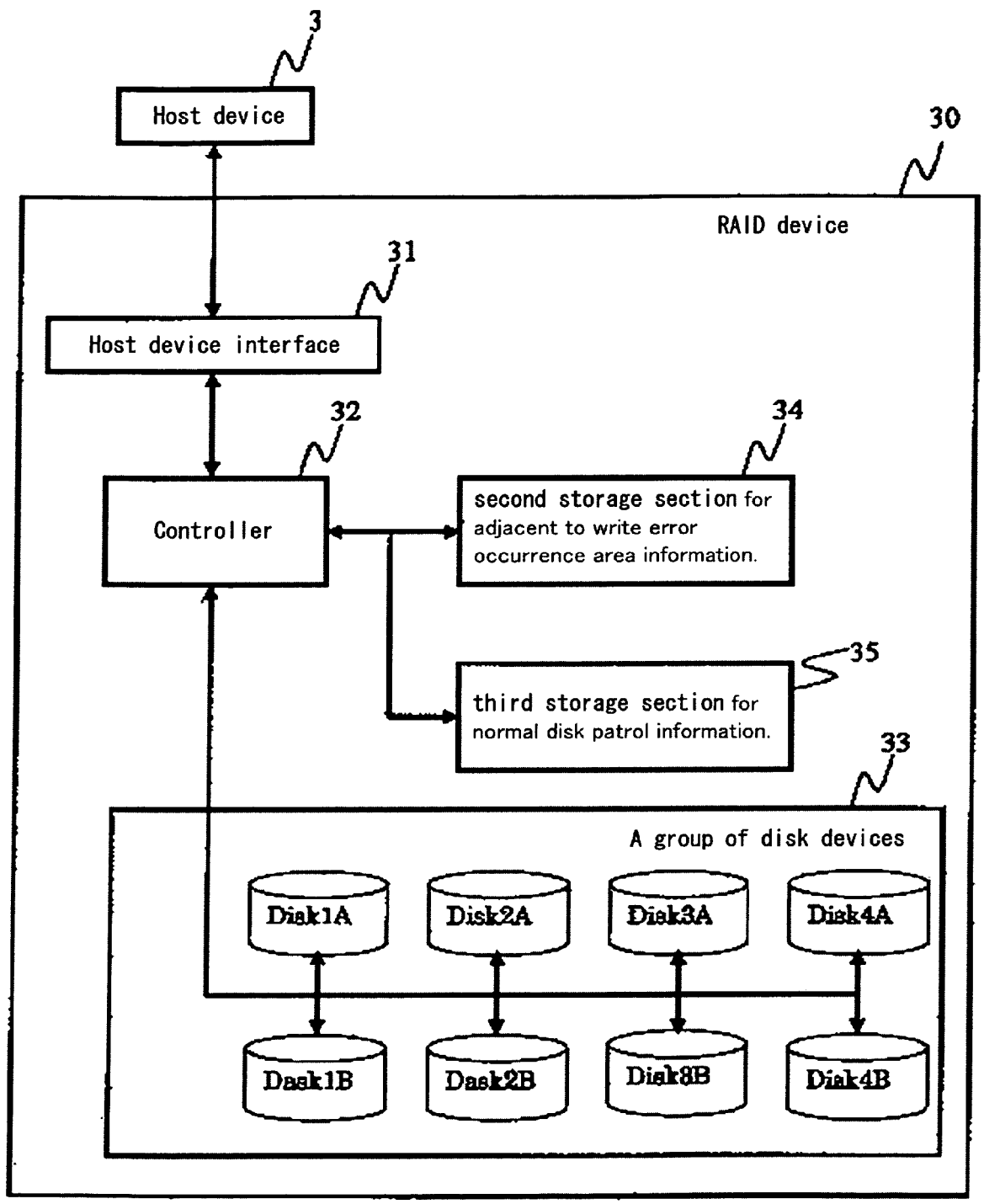
FIG. 3 shows the configuration of a RAID system according to another embodiment of the present invention.
Figure 4:
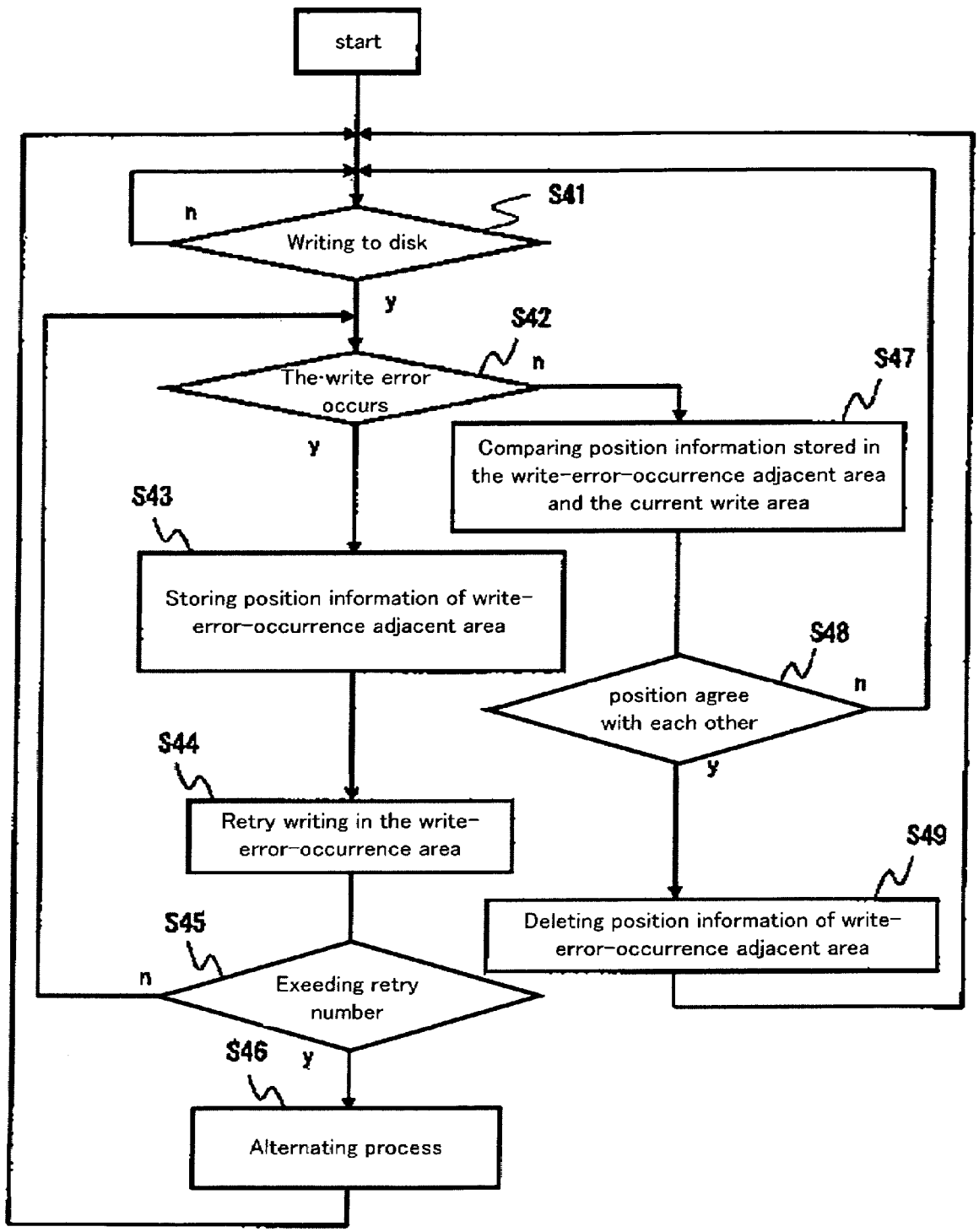
FIG. 4 shows a flowchart illustrating processing performed by the RAID system shown in FIG. 3.
Figure 5:
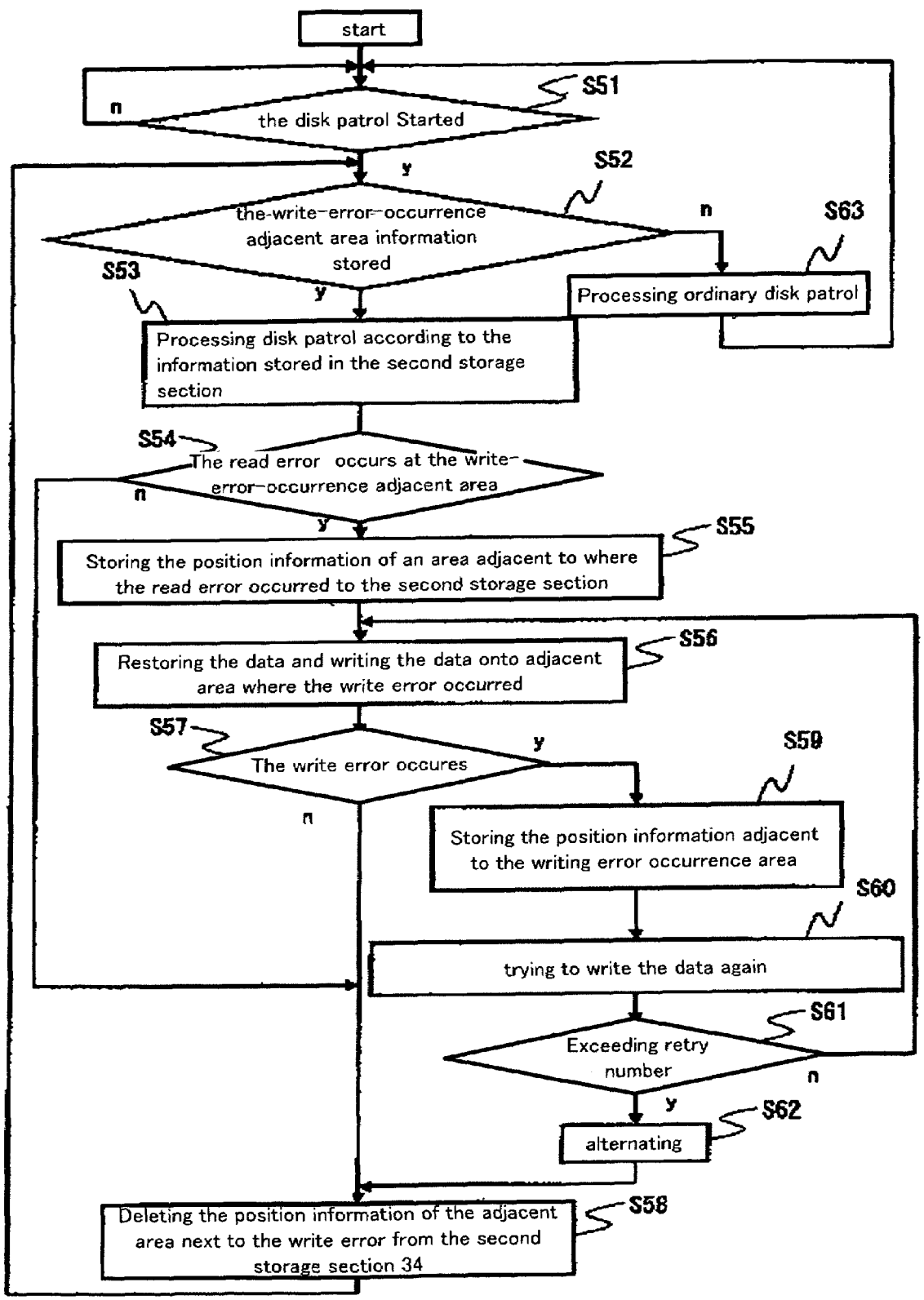
FIG. 5 shows a flowchart illustrating an other processing performed by the RAID system shown in FIG. 3.

FIG. 3 shows the configuration of a RAID device 30 according to a second embodiment of the present invention. FIG. 4 is a flowchart illustrating processing performed by a controller 32 provided in the RAID device 30, so as to detect the write error, according to the embodiment of the present invention. FIG. 5 is a flowchart showing processing performed by the controller 32, so as to restore data after the write error is detected, according to the embodiment, of the present invention.

The RAID device 30 shown in FIG. 3 includes host-device-interface 31, the controller 32, a group of disk devices 33, second storage section 34, and third storage section 35. The RAID device 30 is connected to a host device 3. The interface 31 is provided between the host device 3 and the controller 32 so that a data-read instruction, a data-write instruction, and data are transmitted and/or received between the host device 3 and the controller 32. The controller 32 controls the RAID system 30 and performs processing on the basis of the data-read instruction, the data-write instruction, and the data that are transmitted from the host-device-interface 31. The disk-device group 33 is a set of a plurality of disk devices and stores and/or reads data according to an instruction transmitted from the controller 32. The set is provided, as the RAID. The second storage section 34 can be an area in a memory. The memory is a computer readable medium. The computer readable medium can be for example, a register in the RAM, hard disk drive, or etc.

FIG. 8 shows a more detail construction of the disk 100 for describing the second embodiment of the present invention. The disk 100 has a plurality of tracks 101, 102, 103, 104 and 105 and a plurality of sectors 110, 111, 112. An area on the disk 100 can be determined by track and sector. A plurality of areas 119 are a part of the disk 100.

In FIG. 8, an area 121 is a write area (S42 of FIG. 4). The area 121 is adjacent to an area 120. When the controller 32 had written the data to the area 120 and the write error had occurred at the area 120, the controller 32, for example stored the position information adjacent to the area 120 to the second storage section 34. For example, the areas 121, 122 are adjacent areas in track direction of the write error occurrence area 120. The stored position information in the second storage section 34 is the area 121, 122.

The third storage section 35 can be an area in a memory. The memory is a computer readable medium. The computer readable medium can be for example, a register in the RAM, hard disk drive, or etc. The third storage section 35 stores information about a predetermined area where disk patrol is usually performed. According to an aspect of the embodiments, the controller 32 is implemented in software and/or computer hardware to perform the embodiment processes described here.

FIG. 4 shows processing performed by the controller 32, so as to store information at the position of an area adjacent to storage area where the write error is detected and/or generated. The second storage section 34 already stores the adjacent position information.

The controller 32 waits for a disk-write instruction transmitted from the host device 3 via the host-device-interface 31 (step. S41: No). Upon receiving the disk-write instruction, the controller 32 instructs the disk-device group 33 to write data (step S41: Yes). The controller 32 determines whether the write error occurs (step S42). If it is determined that no write error occurs (step S42: No), the controller 32 performs the processing corresponding to step S47 and later. If the write error occurs (step S42: Yes), the controller 32 performs the processing corresponding to step S43 and later.

For example, the write error can occur at the area 121 in FIG. 8. An area of adjacent to the area 121 is the adjacent area 120 in FIG. 8 (step S42: Yes). The controller 32 stores the position information of an area adjacent to an area where the write error occurs into the second storage section 34 storing information about the write-error-occurrence-area adjacent area (step S43).

Next, the controller 32 retries writing data into the write-error-occurrence area (step S44).

Because, the reason for the write error is unknown to the controller 32. For example, if the reason for the write error is a head tracking error, the controller 32 will write the writing data of step S41 into the write-error-occurrence area in the retry operation. Then, the controller 32 determines whether the number of retries exceeds a predetermined retry number (step S45). When the retry number is equivalent to or smaller than the predetermined retry number (step S45: No), the controller 32 returns to step S42, so as to make the determination once again, the determination relating to whether the write error occurs. If the retry number exceeds the predetermined retry number (step S45: Yes), the controller 32 performs a predetermined alternating processing (step S46) and returns to step S41, so as to write data into the disk once again. The alternating processing executes, for example, to write the data that corresponds to the writing error occurrence area to another area on the disk.

If no write error occurs (step S42: No), the controller 32 compares details on any position information previously stored into the second storage section 34 (the position information of the write-error-occurrence adjacent area) and the position information of the currently-used write area (step S47). The currently-used write area is the area 121 in FIG. 8.

If the second storage section 34 has no position information of the currently-used write area (step S48: No), the controller 32 returns to step S41.

If the position information of the currently-used write area and the stored position information agree with each other (step S48: Yes), the controller 32 deletes the position information data of the area agreeing with each other (step S49) from the second storage section 34, to upgrade the stored write-error-occurrence adjacent area information in the second storage section 34, since the write-error-occurrence adjacent area is now usable for data writing/reading by being correctly overwritten with the currently-wed write area data at S42.

The controller 32 returns to step S41, so as to receive the next data-write instruction.

According to an aspect of the embodiment, after the controller 32 finishes this write operation, the controller 32 can check whether the data corresponding to the position information in the second storage section 34 can be read. And then the controller 32 sends a signal for the end of the write operation to the host 3.

A flowchart shown in FIG. 5 illustrates processing procedures performed, so as to restore data by performing disk patrol mainly on the basis of the information about the position of the area adjacent to the write-error-occurrence area.

According to an aspect of the embodiments, a correction operation can be performed subsequent to the write operation. The correction operation can be, for example, the disk patrol operation.

The controller 32 corrects the erroneous data corresponding to the position information data in the second storage section 34, when the controller 32 execute a disk patrol in FIG. 5.

The disk patrol is a process for increasing the reliability of data. The process of the disk patrol checks a medium by the data reading/writing. The medium is included in each of the disk devices of the disk-device group 23. The process of the disk patrol checks harmonization between the data stored in the disk-device group 23 constituting the RAID. The RAID system 30 performs the disk patrol on a regular basis.

The controller 32 waits for an instruction to start the disk patrol (step S51: No). When the controller 32 detects the instruction to start the disk patrol (step S51: Yes), the controller 32 determines whether or not the second storage section 34 stores the position information of the write error occurrence adjacent area (step S52). The position information pre-stored in S43. If the second storage section 34 stores no position information (step S52: No), the controller 32 performs ordinary disk patrol (step S63), returns to step S51, and waits for an instruction to start performing the next disk patrol. On the other hand, where the second storage section 34 stores the position information (step S52: Yes), the controller 32 performs the processing corresponding to step S53 and later.

The controller 32 performs the disk patrol according to the position information or the write-error-occurrence adjacent area stored in the second storage section 34 (step S53) and determines whether the read error occurs (step S54) at the write-error-occurrence adjacent area. If no read error occurs at the write-error-occurrence adjacent area (step S54: No), the controller 32 performs the processing corresponding to step S58 and later. If the read error occurs at the write-error-occurrence adjacent area (step S54: Yes), the controller 32 stores to the second storage section 34 the position information of an area adjacent to the write-error-occurrence adjacent area where the read error occurs (step S55).

For example, an area adjacent to the write-error-occurrence adjacent area is the area 130 in FIG. 8. Because, when the controller 32 can not read the data corresponding to the position information in the second storage section 34, the head passed over the write-error-occurrence adjacent area 121 and sometimes overwrite the data in a further adjacent area 130. The write-error-occurrence adjacent area 121 has two adjacent areas. One adjacent area is write-error-occurrence adjacent area 120, and the other adjacent area is at the opposite side of write-error-occurrence adjacent area 120 for the write-error-occurrence adjacent area 121. The opposite side of write-error-occurrence area 120 for the write-error-occurrence adjacent area 121 is an area 130. The controller 32 can determine to only store the position information of the area 130 to the second storage section 34, because the controller 32 knows that the write-error-occurrence area 120 is writable.

Next, the controller 32 restores data recorded onto the read-error-occurrence area on the basis of read data by using the RAID function and rewrites the data (step S56).

Next, the controller 32 determines whether or not the write error occurs at the read-error-occurrence area (step S57).

If no write error occurs (step S57: No), the controller 32 deletes information about the position of the write-error-occurrence adjacent area 121 from the second storage section 34 (step S58) and returns to step S52.

On the other hand, if the write error occurs (step S57: Yes), the controller 32 stores information about the position of areas adjacent to the read-error-occurrence area where the write error occurs into the second storage section 34 (step S59). A plurality of adjacent areas are stored at S59, because the head can move to both sides of the read-error-occurrence area in the write operation.

The controller 32 retries writing data into the read-error-occurrence area where the write error occurs (step S60). Then, the controller 32 determines whether or not the number of retries exceeds a predetermined retry number (step S61). When the retry number is equal to or smaller than the predetermined retry number (step S61: No), the controller 32 returns to step S56. If the retry number exceeds the predetermined retry number (step S61: Yes), the controller 32 performs predetermined alternating processing (step S62). The alternating processing executes, for example, to write the data to another area on the disk. The data correspond to the write error occurrence area. And the controller 32 deletes information about the position of an area where alternating processing occurs from the second storage section 34 (step S58). The controller 32 has no access to the position of the alternating process area.

The embodiments comprise not only track direction but also sector direction.

The embodiments allow determining whether data recorded onto an area adjacent to a data-write area is corrupted when a write error occurs. If the data is corrupted, the corrupted data is recovered. Therefore, data is strongly protected with the embodiments.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be restored to, falling within the scope thereof.

What is claimed is:

1. An apparatus comprising:
   a plurality of storage devices capable of restoring data stored in any one of the storage devices from data stored in rest of the storage devices by using Redundant Arrays of Independent Disks function;
   a controller to control the apparatus according to a process comprising:
      detecting a write error when data is written into a first area of a storage device;
      reading data stored in a second area adjacent to said first area of the storage device when the write error is detected;
      detecting any error in of the data read from said second area;
      restoring the data stored in the second area based upon data stored in the rest of the storage devices by using the Redundant Arrays of Independent Disks function, upon detecting any error of the data stored in the second area; and
      storing the restored data into the second area.

2. The apparatus of claim 1, wherein each storage device comprises one or more recording media storing information by a read/write head onto circular tracks on each recording medium, wherein said second area and said first area are radially adjacent tracks.

3. The apparatus according to claim 1, wherein said second are comprises a plurality of adjacent tracks to said first area.

4. The apparatus according to claim 3, wherein the write error is that the write head overwrite adjacent tracks when the write head is moved by the shock for external vibration.

5. The apparatus according to claim 1, wherein the process of the programmed processor further comprises:
storing position information of the second area; writing data in a current area of the storage device; comparing the position information of the second area to the current writing area; and deleting the position information of the second area, if the position information of the second area and the current writing area agree,
wherein the second area data is restored according to the second area position information after completing the current writing.

6. The apparatus according to claim 5, wherein each storage device comprises one or more recording media storing information by a read/write head onto circular tracks on each recording medium, wherein said second area and said first area are radially adjacent tracks, wherein the second area data is restored when a correction operation of the recording medium execute.

7. A method of controlling an apparatus including a plurality of storage devices capable of restoring data stored in any one of the storage devices from data stored in rest of the storage devices by using Redundant Arrays of Independent Disk function, the method comprising:
detecting a write error when data is written into a first area of a storage device;
reading data stored in a second area adjacent to said first area of the storage device when the write error is detected;
detecting any error of the data read from said second area;
restoring the data stored in second area data based upon data stored in the rest of the storage device by using the Redundant Arrays of Independent Disks function, upon detecting any error of the data stored in the second area; and
storing the restored data into the second area.

8. The method of claim 7, wherein each storage device comprises one or more recording media storing information by a read/write head onto circular tracks on each recording medium, wherein said second are and said first area are radially adjacent tracks.

9. The method of claim 7, wherein said second area comprises a plurality of adjacent tracks to said first area.

10. The method of claim 7, wherein the write error is that the write head overwrite adjacent tracks when the write head is moved by the shock for external vibration.

11. The method of claim 7, further comprises:
storing position information of the second area;
writing data in a current area of the storage device;
comparing the position information of the second area to the current writing area; and
deleting the position information of the second area, if the position information of the second area and the current writing area agree,
wherein the second area data is restored according to the second area position information after completing the current writing.

12. The method of claim 7, wherein each storage device comprises one or more recording media storing information by a read/write head onto circular tracks on each recording medium, wherein said second area and said first area are radially adjacent tracks, wherein the second area data is restored when a correction operation of the recording medium execute.

13. An apparatus comprising:
a plurality of storage devices capable of restoring data stored in any one of the storage devices from data stored in rest of the storage devices; and
a controller to control the apparatus according to a process comprising:
detecting a write error when data is written into a first area of a storage device,
reading data stored in a second area adjacent to said first area of the storage device when the write error is detected,
detecting any error of the data read from said second area,
restoring the data stored in the second area based upon data stored in the rest of the storage devices, upon detecting any error of the data stored in the second area, and
storing the restored data into the second area.

* * * * *

UNITED STATES PATENT AND TRADEMARK OFFICE
CERTIFICATE OF CORRECTION

| | | |
|---|---|---|
| PATENT NO. | : 7,805,659 B2 | Page 1 of 1 |
| APPLICATION NO. | : 11/526729 | |
| DATED | : September 28, 2010 | |
| INVENTOR(S) | : Eisaku Takahashi | |

It is certified that error appears in the above-identified patent and that said Letters Patent is hereby corrected as shown below:

Column 8, Line 54 after "error" delete "in".

Column 9, Line 2 delete "are" and insert --area--, therefor.

Column 9, Line 35 before "based" delete "data".

Column 9, Line 44 after "second" delete "are" and insert --area--, therefor.

Signed and Sealed this
Twenty-eighth Day of December, 2010

David J. Kappos
*Director of the United States Patent and Trademark Office*